US012489541B2

(12) United States Patent
Al Sayeed

(10) Patent No.: US 12,489,541 B2
(45) Date of Patent: Dec. 2, 2025

(54) ADAPTIVE BUNDLING FOR CAPACITY CHANGES IN CHANNEL HOLDER BASED OPTICAL LINKS

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 419 days.

(21) Appl. No.: 18/116,539

(22) Filed: Mar. 2, 2023

(65) Prior Publication Data

US 2023/0208547 A1    Jun. 29, 2023

Related U.S. Application Data

(63) Continuation-in-part of application No. 17/601,950, filed as application No. PCT/US2020/027124 on Apr. 8, 2020, now Pat. No. 11,777,634, which is a continuation of application No. 16/378,830, filed on Apr. 9, 2019, now Pat. No. 10,680,737.

(51) Int. Cl.
*H04J 14/02* (2006.01)

(52) U.S. Cl.
CPC ...... *H04J 14/0212* (2013.01); *H04J 14/0213* (2013.01); *H04J 14/0227* (2013.01)

(58) Field of Classification Search
CPC ............... H04J 14/0212; H04J 14/0213; H04J 14/0227; H04J 14/0256; H04J 14/0267; H04J 14/0284
See application file for complete search history.

(56) References Cited

U.S. PATENT DOCUMENTS

| 6,031,647 A | 2/2000 | Roberts |
| 6,304,347 B1 | 10/2001 | Beine et al. |
| 6,959,149 B2 | 10/2005 | Bragg et al. |
| 7,483,205 B1 | 1/2009 | Lundquist et al. |
| 8,509,621 B2 | 8/2013 | Boertjes et al. |

(Continued)

FOREIGN PATENT DOCUMENTS

WO    2019179320 A1    9/2019

OTHER PUBLICATIONS

Dimitrios Klonidis et al. , "Spectrally and Spatially Flexible Optical Network Planning and Operations," Feb. 19, 2015, IEEE Communications Magazine , vol. 53, Issue 2 , Feb. 2015, pp. 69-77.*

(Continued)

*Primary Examiner* — Omar S Ismail
(74) *Attorney, Agent, or Firm* — Baratta Law PLLC; Lawrence A. Baratta, Jr.

(57) ABSTRACT

Adaptive bundling of capacity changes in an optical section includes, responsive to a request for a capacity change for a plurality of channels on an optical section, determining spectral loading of the optical section; determining a bundling of changes for the capacity change based on the spectral loading of the optical section; and performing the capacity change based on the bundling. The bundling includes a number of steps to achieve all of the capacity change and a maximum allowable amount of optical spectrum that can be changed in each step. The maximum allowable amount of optical spectrum that can be changed in each step can be adaptively determined based on the channel loading.

20 Claims, 17 Drawing Sheets

(56) References Cited

U.S. PATENT DOCUMENTS

| | | | |
|---|---|---|---|
| 8,909,038 B2 | 12/2014 | Cannon et al. | |
| 8,971,705 B2 | 3/2015 | Boertjes et al. | |
| 9,197,322 B2 | 11/2015 | Boertjes et al. | |
| 9,252,913 B2 | 2/2016 | Al Sayeed et al. | |
| 9,276,696 B2 | 3/2016 | Al Sayeed et al. | |
| 9,344,191 B2* | 5/2016 | Al Sayeed | H04J 14/02216 |
| 9,419,708 B2 | 8/2016 | Rad et al. | |
| 9,768,902 B2 | 9/2017 | Al Sayeed et al. | |
| 9,906,294 B2* | 2/2018 | Al Sayeed | H04J 14/0268 |
| 9,985,726 B1* | 5/2018 | Al Sayeed | H04J 14/021 |
| 11,777,634 B2* | 10/2023 | Al Sayeed | H04J 14/0263 398/48 |
| 2002/0093711 A1* | 7/2002 | Simmons | H04J 14/0213 398/58 |
| 2002/0196490 A1* | 12/2002 | Smith | H04J 14/0227 398/58 |
| 2004/0208648 A1* | 10/2004 | Fishman | H04B 10/25137 398/189 |
| 2006/0051093 A1 | 3/2006 | Manna | |
| 2009/0284983 A1* | 11/2009 | Levine | E21D 9/14 362/554 |
| 2011/0135301 A1 | 6/2011 | Myslinski et al. | |
| 2012/0121255 A1 | 5/2012 | Sakamoto | |
| 2012/0257636 A1* | 10/2012 | Beshai | H04J 14/0267 370/401 |
| 2012/0328296 A1 | 12/2012 | Sullivan et al. | |
| 2013/0045006 A1 | 2/2013 | Dahan et al. | |
| 2014/0161449 A1* | 6/2014 | Doerr | H04L 47/72 398/45 |
| 2014/0198812 A1 | 7/2014 | Olsson et al. | |
| 2015/0244492 A1 | 8/2015 | Lee | |
| 2015/0333864 A1* | 11/2015 | Swinkels | H04B 10/0795 398/79 |
| 2016/0094304 A1 | 3/2016 | Butler et al. | |
| 2016/0261362 A1 | 9/2016 | Ojima et al. | |
| 2017/0085316 A1* | 3/2017 | Al Sayeed | H04B 10/03 |
| 2017/0104632 A1* | 4/2017 | Kim | H04L 41/0826 |
| 2018/0234749 A1 | 8/2018 | Chedore et al. | |
| 2019/0229830 A1* | 7/2019 | Bruno | H04L 41/40 |
| 2020/0007965 A1* | 1/2020 | Swinkels | H04J 14/02122 |

OTHER PUBLICATIONS

Thanh-Nga Duong et al., "Adaptive Loading Algorithm Implemented in AMOOFDM for NG-PON System Integrating Cost-Effective and Low-Bandwidth Optical Devices," May 22, 2009, IEEE Photonics Technology Letters, vol. 21, No. 12, Jun. 15, 2009, pp. 790-791.*

António Eira et al., "On the Efficiency of Flexible Ethernet Client Architectures in Optical Transport Networks," Dec. 22, 2017, Journal of Optical Communications and Networking, vol. 10, Issue 1, Jan. 2018,A133-A141.*

Pin-Han Ho et al.,"Routing and Wavelength Assignment With Multigranularity Traffic in Optical Networks," Feb. 21, 2002, Journal of Lightwave Technology, vol. 20, No. 8, Aug. 2002,pp. 1292-1301.*

Changsheng Yu et al.,"Uplink Scheduling and Link Adaptation for Narrowband Internet of Things Systems," Mar. 13, 2017, IEEE Access, vol. 5, 2017, pp. 1724-1729.*

Jul. 9, 2020, International Search Report and Written Opinion for International Patent Application No. PCT/US2020/027124.

* cited by examiner

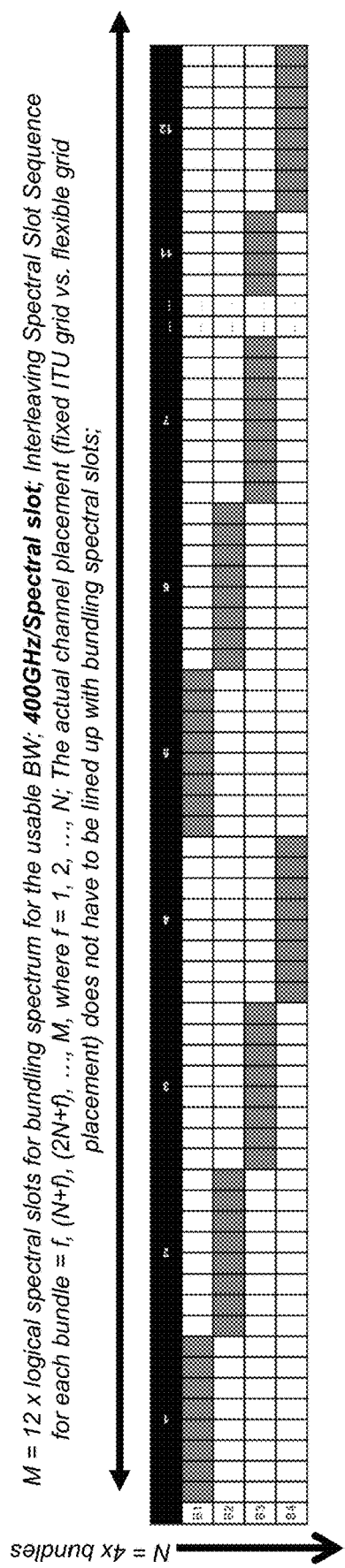

FIG. 5A

$M = 12 \times$ logical spectral slots for bundling spectrum for the usable BW; 400GHz/Spectral slot; Interleaving Spectral Slot Sequence for each bundle = $f$, $(N+f)$, $(2N+f)$, ..., $M$, where $f = 1, 2, ..., N$; The actual channel placement (fixed ITU grid vs. flexible grid placement) does not have to be lined up with bundling spectral slots;

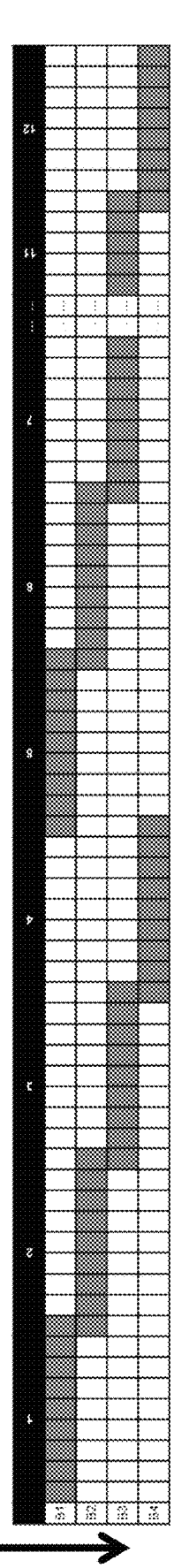

FIG. 5B

$M = 12 \times$ logical spectral slots for bundling spectrum for the usable BW; 400-450GHz per Spectral slot with partial overlap; Interleaving Spectral Slot Sequence for each bundle = $f$, $(N+f)$, $(2N+f)$, ..., $M$, where $f = 1, 2, ..., N$; The actual channel placement (fixed ITU grid vs. flexible grid placement) does not have to be lined up with bundling spectral slots;

- Bandwidth for spectral slots can be overlapping between consecutive bundles to ensure channel falling within the overlapping bandwidth can be swapped out by either bundle

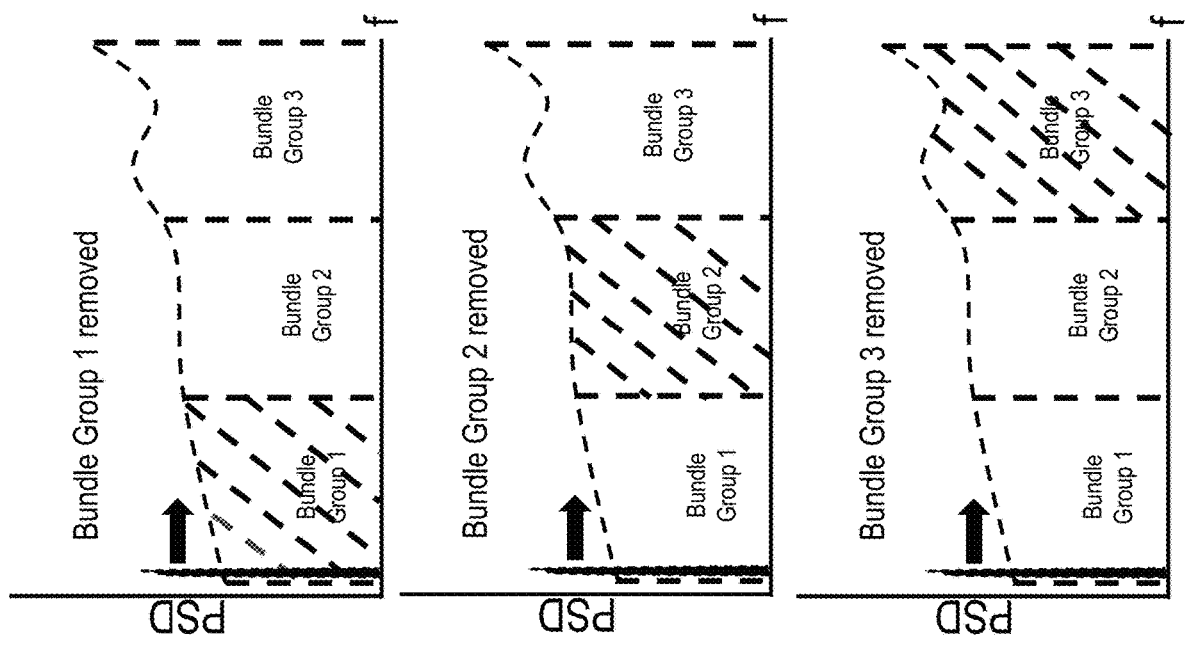
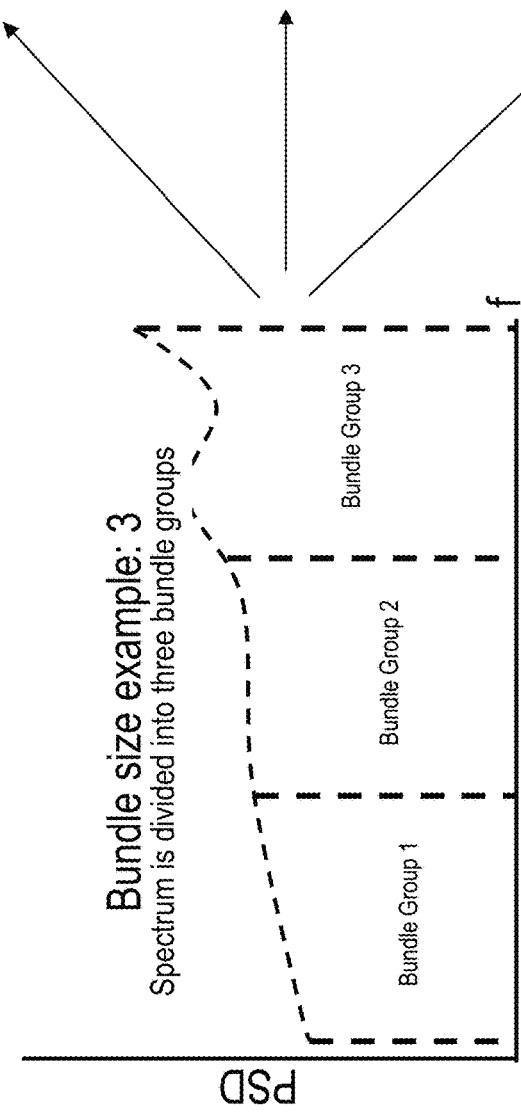
FIG. 8

Gain saturation effect is enhanced when ASE channels in BundleGroup1 is removed due to hole burning

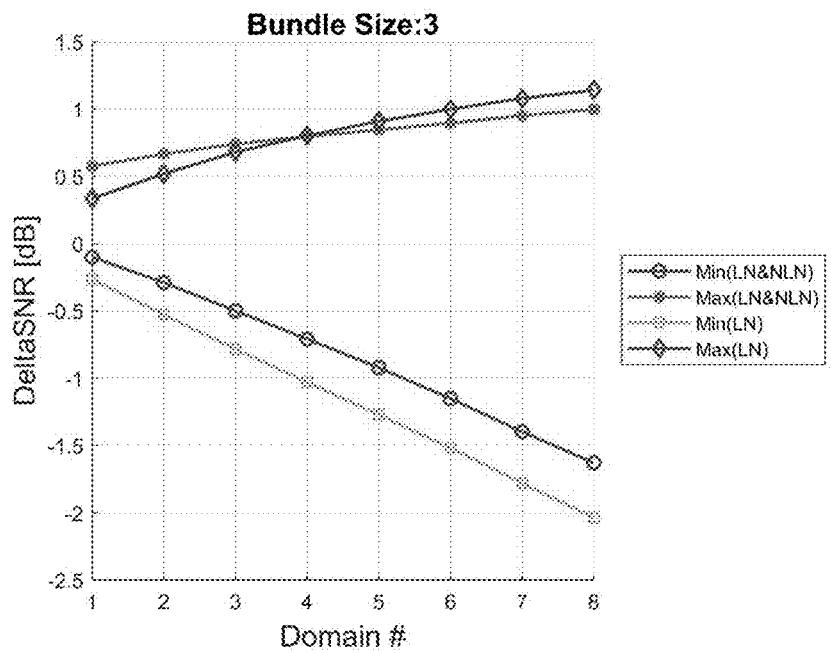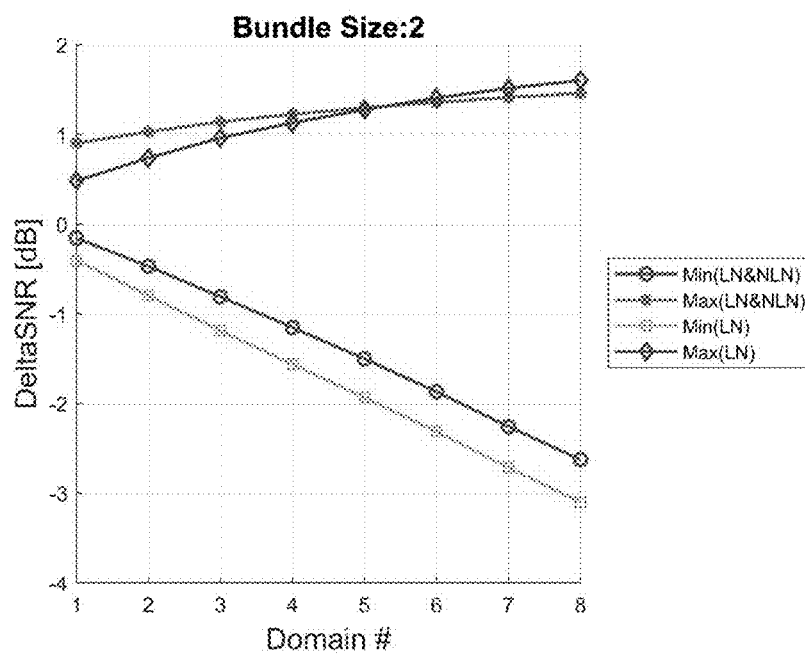
FIG. 13B

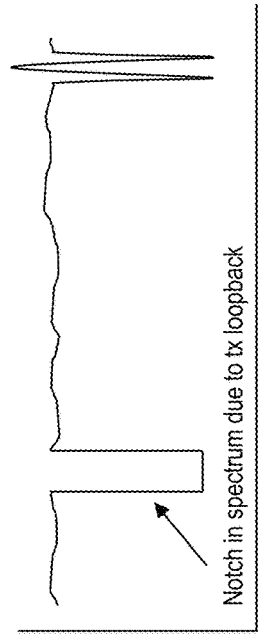

(1) Typical ASE filled spectrum with a traffic channel

FIG. 14A

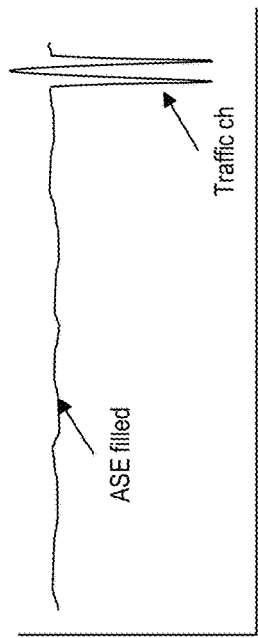

(2) For channel add, interleaved bundling creates transient spectrum notches while switching from ASE port to traffic

FIG. 14B

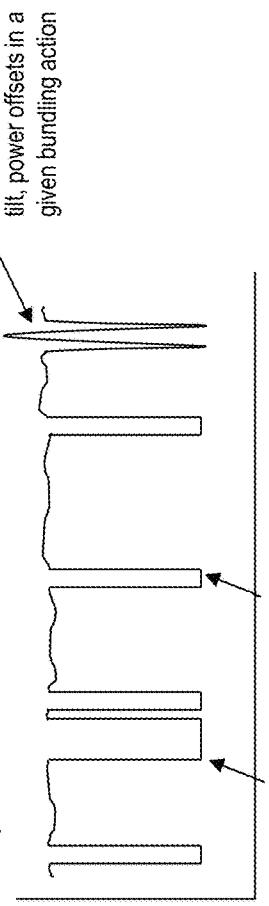

(3) Channel (part of spectrum) is in photonic loopback in an ASE filled spectrum

FIG. 14C

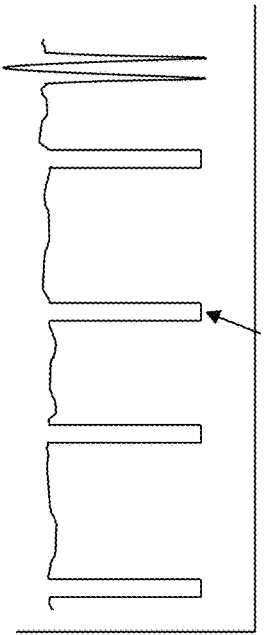

(4) capacity add taking place in other areas of the spectrum, while loopback in progress in one location, creating un-budgeted gaps within the spectrum

FIG. 14D

ADAPTIVE BUNDLING FOR CAPACITY CHANGES IN CHANNEL HOLDER BASED OPTICAL LINKS

CROSS-REFERENCE TO RELATED APPLICATION(S)

The present disclosure is a continuation-in-part of U.S. patent application Ser. No. 17/601,950, filed Oct. 7, 2021, which was a national stage of PCT Patent Application No. PCT/US20/27124, filed Apr. 8, 2020, which claimed priority to U.S. patent application Ser. No. 16/378,830, filed Apr. 9, 2019, which is now U.S. Pat. No. 10,680,737, issued Jun. 9, 2020.

FIELD OF THE DISCLOSURE

The present disclosure generally relates to optical networking. More particularly, the present disclosure relates to systems and methods for bundling capacity changes in channel holder based optical links.

BACKGROUND OF THE DISCLOSURE

Optical networks include nodes interconnected by optical links formed by fiber optic cables including various pre-amplifiers, post-amplifiers, and optional intermediate line amplifiers. Various power control techniques are utilized to control optical power through the various amplifiers, over the optical links. With advance coherent modulation and the like, conventional power control techniques for optimization are slow, i.e., operate in seconds, leading to slow capacity changes (i.e., add/delete channels for new demands or restoration). A technique to deal with the control of optical power involves the use of so-called channel holders which can include Amplified Stimulated Emission (ASE) sources, modulated lasers, unmodulated lasers, etc. Channel holders are used in optical links to keep optical spectrum in full-fill loading condition so that any capacity change activity can be digitally handled by switching the channel holders with traffic signals, i.e., there is no need to perform an optimization because any capacity change includes swapping a traffic channel for a channel holder or vice versa. The conventional approach of swapping channels is limited. For example, one approach is to swap one channel at a time which is inefficient. Assuming 2-4 s to add each channel, to add 95× channels on top 1× In-Service (IS) channel, will take around 190-380 s per Optical Multiplex Section (OMS).

While channel holders solve the optimization time problem, there is a need to perform capacity changes, i.e., swapping channel holders for traffic channels without causing too much power transition in a line system, and vice versa, faster than one channel or set of contiguous channels at a time.

BRIEF SUMMARY OF THE DISCLOSURE

In an embodiment, a method of adaptive bundling includes, responsive to a request for a capacity change for a plurality of channels on an optical section, determining channel loading of the optical section; determining a bundling of changes for the capacity change based on the channel loading of the optical section; and performing the capacity change based on the bundling. Note, the performing can also mean causing performance of. The bundling includes a number of steps to achieve all of the capacity change and a maximum allowable amount of optical spectrum that can be changed in each step. The maximum allowable amount of optical spectrum that can be changed in each step can be adaptively determined based on the channel loading. The capacity change includes addition of a traffic channel by switching away from a channel holder source, deletion of a traffic channel by switching to the channel holder source, and a combination thereof. The optical section includes a full fill loading condition of its optical spectrum that includes any of traffic channels, channel holders, and unoccupied spectrum. The unoccupied spectrum can include a notch or gap in the optical spectrum, wherein the unoccupied spectrum reduces a maximum allowable amount of the optical spectrum that can be changed in any step of the bundling. The unoccupied spectrum can include a notch or gap in the optical spectrum, such as, e.g., due to one or more of a loopback channel and equipment issues related to multiplexing and demultiplexing components in the optical section.

In another embodiment, an OADM includes a Wavelength Selective Switch (WSS) having inputs connected to a channel holder source and a plurality of traffic ports, and having an output connected to an optical section; and a controller configured to, responsive to a request for a capacity change for a plurality of channels on the optical section, determine channel loading of the optical section, determine a bundling of changes for the capacity change based on the channel loading of the optical section, and cause the capacity change based on the bundling, wherein the capacity change includes switching between any of the channel holder source and the plurality of traffic ports.

In a further embodiment, an Optical Add/Drop Multiplexer (OADM) node includes a Wavelength Selective Switch (WSS) connected to an optical section in an optical network; and a controller communicatively coupled to the WSS and configured to, responsive to a request for capacity change of X channels, X is an integer>1, on the optical section, divide optical spectrum on the optical section into M slots, M is an integer>1, such that the capacity change of X channels takes a maximum of N steps, N is an integer>1, and cause performance of the capacity change of X channels in up to the N steps in an interleaved manner that changes a subset of the X channels in each of the N steps. For each step, the performing can include a maximum of M/N slots of the M slots in each of the N steps with spacing between each of the M/N slots used for the capacity change in a corresponding step. The spacing can be f, (N+f), (2N+f), . . . , M over the optical spectrum, where f is each step, f=1, 2, . . . , N. The capacity change can include any of adding channels by replacing channel holders and removing channels by adding channel holders. Some or all of the M slots can have equal or unequal bandwidth, and bandwidth of some or all of the M slots is dynamically adjustable based on the capacity change handled on that step. A given channel can have a corresponding capacity change in a given step if the given channel falls partially or fully within a given slot for the given step. The performing the capacity change can be performed, when power is known to be available at multiplexer input using locally monitored points, without coordination and communication with other OADM nodes in the optical network. If a capacity change is not requested for one of the M slots, optical signals or channel holders on that slot can remain uninterrupted during the capacity change.

In another further embodiment, a method includes, responsive to a request for capacity change of X channels, X is an integer>1, on an optical section and at an Optical Add/Drop Multiplexer (OADM) node in an optical network, dividing optical spectrum on the optical section into M slots, M is an integer>1, such that the capacity change of X channels takes a maximum of N steps, N is an integer>1; and performing the capacity change of X channels in up to the N steps in an interleaved manner that changes a subset of the X channels in each of the N steps. For each step, the performing can include a maximum of M/N slots of the M slots in each of the N steps with spacing between each of the M/N slots used for the capacity change in a corresponding step. The spacing can be f, (N+f), (2N+f), . . . , M over the optical spectrum, where f is each step, f=1, 2, . . . , N. The capacity change can include any of adding channels by replacing channel holders and removing channels by adding channel holders. Some or all of the M slots can have equal or unequal bandwidth, and bandwidth of some or all of the M slots is dynamically adjustable based on the capacity change handled on that step. A given channel can have a corresponding capacity change in a given step if the given channel falls partially or fully within a given slot for the given step. The performing the capacity change can be performed, when power is known to be available at multiplexer input using locally monitored points, without coordination and communication with other OADM nodes in the optical network.

In another further embodiment, a controller includes a processor; and memory including instructions executable by the processor that, in response to such execution, cause the processor to perform a set of operations including, responsive to a request for capacity change of X channels, X is an integer>1, on an optical section and at an Optical Add/Drop Multiplexer (OADM) node in an optical network, dividing optical spectrum on the optical section into M slots, M is an integer>1, such that the capacity change of X channels takes a maximum of N steps, N is an integer>1, and performing the capacity change of X channels in up to the N steps in an interleaved manner that changes a subset of the X channels in each of the N steps. For each step, the performing can include a maximum of M/N slots of the M slots in each of the N steps with spacing between each of the M/N slots used for the capacity change in a corresponding step. The capacity change can include any of adding channels by replacing channel holders and removing channels by adding channel holders. Some or all of the M slots can have equal or unequal bandwidth, and bandwidth of some or all of the M slots is dynamically adjustable based on the capacity change handled on that step. A given channel can have a corresponding capacity change in a given step if the given channel falls partially or fully within a given slot for the given step.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 5A is a graph of optical spectrum illustrating a further bundling example using the bundling process of FIG. 3 where M=24 and N=4.

FIG. 5B is a graph of optical spectrum illustrating a bundling example using the bundling process of FIG. 3 where M=24 and N=4 with partial overlap.

FIG. 8 are graphs for the contiguous bundling with a single probe channel case.

FIGS. 13A and 13B are graphs of worst-case SNR penalty for a single probe channel at any given spectral location during the interleaving bundling with different bundle sizes.

FIGS. 14A-14D are graphs of optical spectrum illustrating the effect of steady-state spectrum notches on capacity change bundling.

DETAILED DESCRIPTION OF THE DISCLOSURE

The present disclosure relates to systems and methods for bundling capacity changes in channel holder based optical links. Specifically, the present disclosure improves the speed of capacity changes with channel holders through an interleaved bundle approach that limits the impact of amplifier tilt, ripple, and hole burning effects to limit the impact of capacity changes in Stimulated Raman Scattering (SRS) only. These are the key four variables that typically affect capacity changes in spectrally full-filled channel holder based optical links, and the present disclosure effectively removes 3 out of 4 from the equation (only SRS remains).

Optical Network

Figure 1:
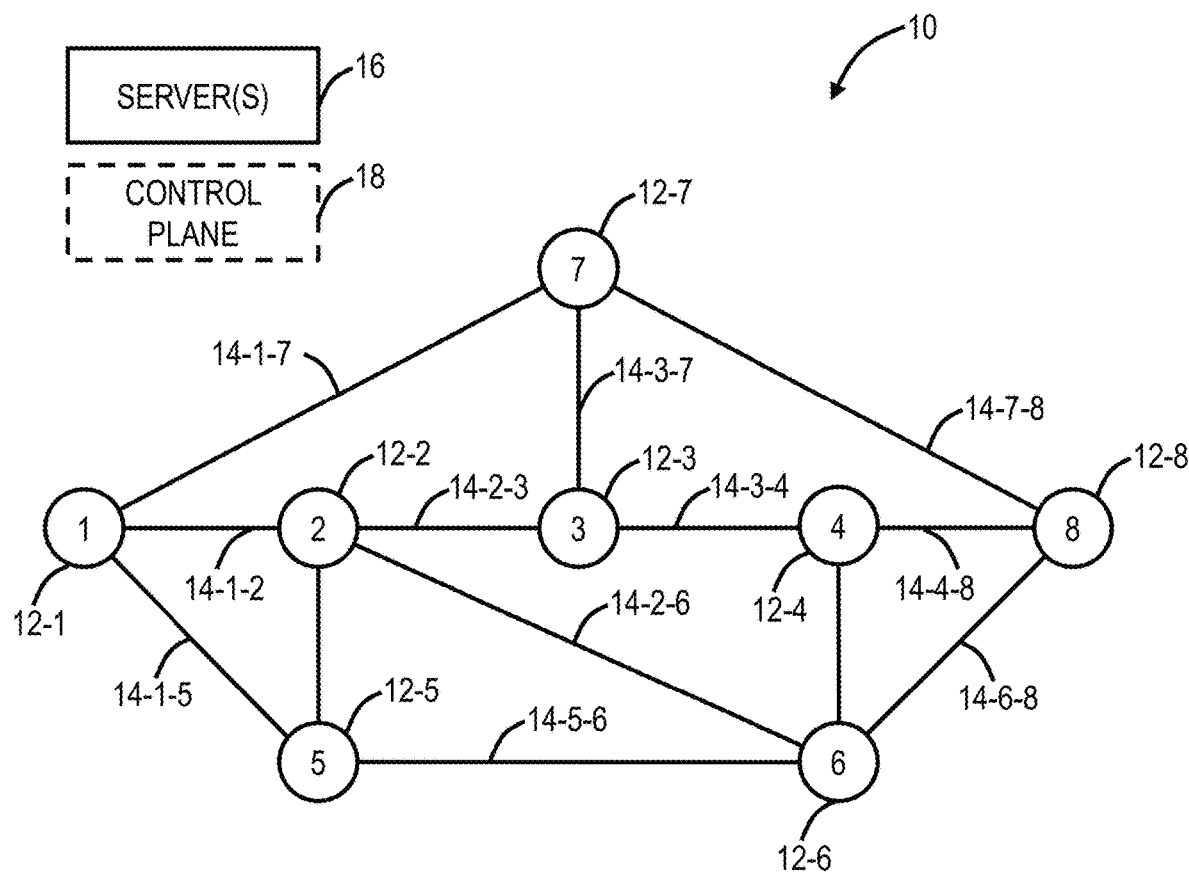
FIG. 1 is a network diagram of an optical network.

FIG. 1 is a network diagram of an optical network 10. The optical network 10 includes nodes 12, labeled as nodes 12-1-12-8, interconnected to one another via links 14 which physically can include one or more optical fibers. The nodes 12 can also be referred to as network elements and can include, without limitation, Wavelength Division Multiplex (WDM) terminals, Dense WDM (DWDM) terminals, Optical Add/Drop Multiplexers (OADMs), Reconfigurable OADMs (ROADMs), optical cross-connects, optical switches, Packet-Optical Transport Systems (POTS), routers, switches, and the like. In various embodiments, the nodes 12 include various hardware and software to communicate with one another via wavelengths/spectrum as well as optionally digital communication via timeslots, packets, etc. At a physical layer, the nodes 12 provide one or more wavelengths between one another over the links 14. Note, while FIG. 1 shows a single node 12 at each location, there can be multiple devices or network elements providing multiple wavelengths. For illustration purposes, each of the links is labeled as link 14-X-Y where X and Y are the nodes interconnected by the links 14.

The optical network 10 can also include one or more servers 16 and/or a control plane 18. The servers 16 can include or operate as, for example, a Software Defined Networking (SDN) controller, an SDN application, a Network Management System (NMS), an Element Management System (EMS), a planning tool, a Path Computation Element (PCE), etc. The control plane 18 provides an automated allocation of network resources in an end-to-end manner. Examples of control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. That is, the control plane 18 is configured to establish end-to-end signaled connections to route channels and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

The optical network 10 has a mesh architecture. Each of the links 14 is an Optical Multiplex Section (OMS) section, and each link 14 can include various amplifiers including pre-amplifiers, post-amplifiers, and intermediate line amplifiers (these are omitted in FIG. 1 for illustration purposes). Of note, the OMS sections can have different fill levels in terms of occupied channels or spectrum, which is the purpose of channel holders—to present a full-fill loading condition. For example, a wavelength #1 can be routed from node 12-1 to node 12-8 via the node 12-7 and a wavelength #2 can be routed from node 12-1 to node 12-3 via the node 12-7. Thus, the wavelengths #1, #2 share the link 14-1-7. As one of ordinary skill can appreciate, various other wavelengths can also be equipped such that the links 14 can have various different fill levels. Further, the wavelengths #1, #2 traverse an intermediate OADM at the node 12-7, thus this is said to be a cascaded optical network as different wavelengths can traverse multiple OMS sections (links 14).

Figure 2:
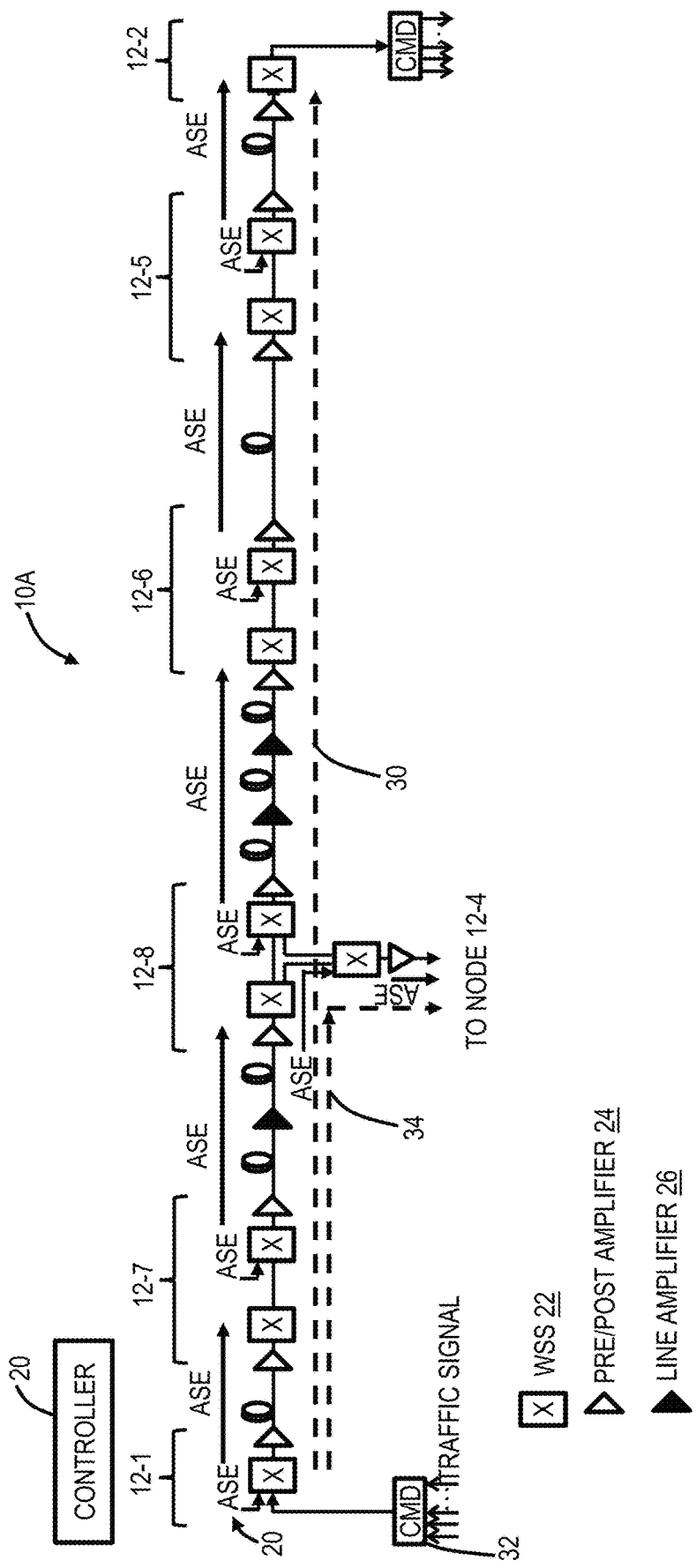
FIG. 2 is a network diagram of a portion of the optical network of FIG. 1 illustrating additional details for describing the use of channel holder sources.

FIG. 2 is a network diagram of a portion 10A of the optical network 10 illustrating additional details for describing the use of channel holder sources 20. For illustration purposes, the portion 10A is shown in a unidirectional configuration from the node 12-1 to the node 12-2 with intermediate nodes 12-7, 12-8, 12-6, 12-5 and a branching degree from the node 12-8 to the node 12-6. Those of ordinary skill in the art will recognize a practical embodiment includes complementary equipment in the opposite direction to form bidirectional connectivity. The nodes 12 include Wavelength Selective Switches (WSS) 22 for each degree, pre/post amplifiers 24, and some of the links 14 include line amplifiers 26. Note, the WSS 22 can generally be defined as an OADM device/OADM multiplexer circuit pack, namely other degree forming components are also contemplated. For illustration purposes, a traffic signal 30 is shown between the node 12-1 and the node 12-2 and the traffic signal is added/dropped via a multiplexer/demultiplexer 32. Another traffic signal 34 is shown between the node 12-1 and through the node 12-8 to the node 12-6. Note, at the node 12-1, the traffic signals 30, 34 are added together at the multiplexer/demultiplexer 32, but these signals 30, 34 are separated at the node 12-8. As described herein, a traffic channel or signal is one carrying traffic, i.e., an in-service, operating channel with data modulated thereon. Conversely, a channel holder, ASE signal, idler, etc. (those skilled in the art understand these terms are all equivalent) is optical power (e.g., ASE loading) without traffic.

The channel holder sources 20 can be injected at each WSS 22 in the multiplexer direction to replicate a channel's signal spectral shape, such that unoccupied or faulted channels can be present on the links 14 for optical power purposes. In an embodiment, the channel holder sources 20 can be ASE-based, modulated, unmodulated, etc. An objective is to fill in the spectrum on the links 14 initially so that each OMS section remains full-fill regardless of how many traffic channels are actually equipped. For example, the channel holder sources 20 can be injected locally to fill empty spectrum space, where there is no traffic signal present. When a traffic signal is provisioned or appears from an upstream node 12, the spectrum space is switched from the channel holder 20 to the traffic switch port to make adequate spectral space for the traffic signal.

With the spectrum at full-fill and the channel holder sources 20 being launched at the same power level as the traffic signals, the total power within each OMS link 14 remains constant; overcapacity changes that keep SRS, ripple, tilt, Spectral Hole Burning (SHB) impact on the OMS link 14 the same in the steady-state. The long chain of amplifiers 24, 26 can be either gain controlled or Total Output Power (TOP) controlled in their respective OMS link 14, i.e., on one OMS link 14, all amplifiers can be gain controlled, whereas, in the next OMS link 14, all amplifiers can be TOP controlled.

A controller 20 can be communicatively coupled to the OADM nodes 12 and the intermediate optical line amplifiers. In an embodiment, the controller 20 can be "in-skin" where it is part of one or more of the OADM nodes 12, i.e., a module contained therein. In another embodiment, the controller 20 can be an external device that is in communication with the various nodes. In either embodiment, the controller 20 is generally a processing device that obtains inputs from the optical network 10 and provides outputs for configuring the optical network 10. The controller 20 can perform a control algorithm/loop for managing wavelengths/spectrum from a physical perspective at Layer 0. In one aspect, the controller 20 is configured to add/remove wavelengths/spectrum from the spans in a controlled manner to minimize impacts to existing, in-service, traffic-carrying channels. For example, the controller 20 can adjust modem launch powers, optical amplifier gain, Variable Optical Attenuator (VOA) settings, WSS parameters, etc.

Capacity Change with Channel Holders

Thus, on channel holder based optical links 14, ASE-based channels are injected at each backbone OADM location at the mux direction, where ASE is carved to replicate traffic signals' spectral shapes. For capacity changes, power on specific spectral locations are swapped out between channelized ASE and traffic signals, i.e., for an add, ASE channels will be taken out and replaced with traffic signals and vice versa for delete. For large capacity changes (for high channel count add or deletes), if all ASE channels are swapped out in one shot, then the remaining in-service channels on the link will experience a large transient power offset due to SRS, amplifier ripple and tilt changes and in some cases due to Spectral Hole Burning (SHB) impacts. This will cause in-service channels to experience a momentary traffic hit depending on their available margin to tolerate the switching transient. Such transient impacts defeat the whole purpose of deploying channel holders in every mux locations in the first place that is supposed to make capacity changes hitless to in-service channels.

To improve the speed of capacity changes, there is a requirement for some level of bundling. This means, instead of swapping all ASE holders in one shot or one at a time, the ASE channel holders are swapped out in multiple bundles, i.e., few at a time, to introduce traffic signals at those locations and then move to the next bundle. This bundling approach is required to reduce any power offsets, and Signal-to-Noise Ratio (SNR) margin impacts on pre-existing in-service channels due to SRS, amplifier ripple and dynamic tilt changes, and SHB impacts that take place power on specific spectral locations are taken out from the full-fill channel holder based optical links.

This disclosure specifically focuses on developing a bundling approach for channel holder based optical links with an objective to provide low transient impacts during capacity changes, to keep the capacity change time low irrespective of OADM hop counts, and without any communication between adjacent optical section controllers to notify each other for any sequential actions. More precisely, the disclosure proposes an interleaving bundling approach to swap out ASE holders in interleaving logical spectral boundaries (slots) in different bundles that primarily experience the impact of SRS due to changes in total power to fiber in each bundle, but drastically minimizes the dynamic impact of amplifier tilt changes, and hole burning impacts during capacity changes. The approach can allow aggressive bundling for channel holder based optical links to minimize capacity change times, where each OMS controller can apply bundling on its own without any notification between peers.

Problem Description

In the network 10, it is assumed, relative to capacity changes, that there is no communication or sequencing between optical sections. The communication infrastructure simply may not available due to customer preference, or because the OMS is running equipment from different vendors, or the like. That means, when the capacity change request will come into each OADM node 12, a local controller in each OADM node 12 will apply its own set of bundling (no coordination with upstream or downstream controllers). The local controller can check if channel power is available on its input monitoring point before making a switch. The local controller would not be able to differentiate if the power visible from upstream is coming from ASE holders or from real traffic signals Hence, in most cases for capacity changes, what happens is all downstream OADM nodes 12 switch to upstream ASE holders applying their own bundling, while the ingress mux will wait for the Tx to be tuned, and when the power shows up from Tx, the ingress mux will switch applying its own bundling. That means, a bundling algorithm has to be designed such that the end-to-end transient impact remains low for the maximum traversed path distance, while the ingress mux does the switch. The capacity change timing to complete the ASE swap for all adding/deleting channels remains fast (in seconds preferably, and not in minutes, regardless of hop counts).

This disclosure specifically focuses on developing a bundling approach for channel holder based optical links that provides low transient impacts and keeps the capacity change time low irrespective of hop counts and without any communication between optical sections to sequence the channel actions.

Bundling Approach

Figure 3:
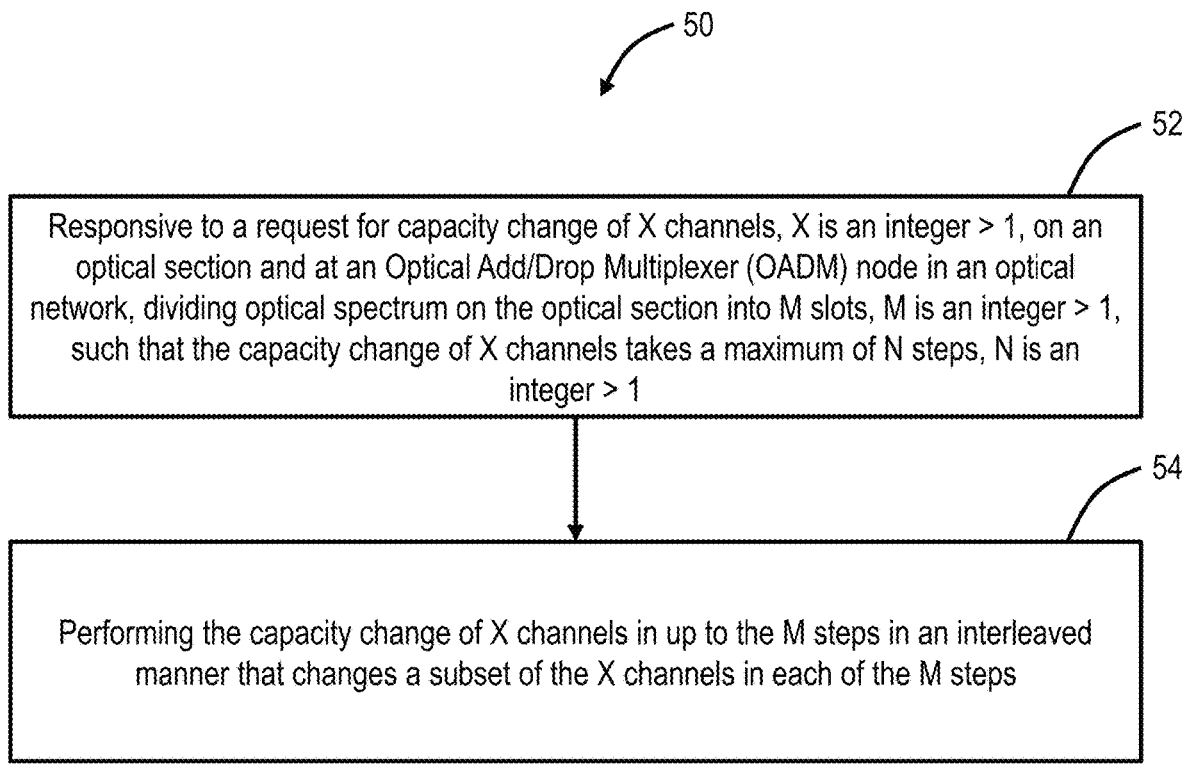
FIG. 3 is a flowchart of a bundling process utilizing a local controller in an Optical Add/Drop Multiplexer (OADM) node to replace channel holders with traffic signals on an optical section.

FIG. 3 is a flowchart of a bundling process 50 utilizing a local controller in an OADM node to replace channel holders with traffic signals on an optical section. As described herein, a bundle represents a number of channels that are to be added to the optical section. The objective of the bundling process 50 is to add the channels by replacing channel holders in a parallel manner, i.e., not sequentially, to speed up the process such that a capacity change requires N bundles (N>1) which is much less than sequential changes. Of note, the bundling process 50 is described with reference to adding channels (traffic signals) by replacing channel holders (ASE). The same process could be used to remove channels by replacing the traffic signals with channel holders. Each optical section (i.e., an OMS) has usable optical spectrum such as the C-band (e.g., 1528 nm-1565 nm), the L-band (e.g., 1565 nm-1625 nm), etc.

The bundling process 50 includes, responsive to a request for capacity change of X channels, X is an integer>1, on an optical section and at an Optical Add/Drop Multiplexer (OADM) node in an optical network, dividing optical spectrum on the optical section into M slots, M is an integer>1, such that the capacity change of X channels takes a maximum of N steps, N is an integer>1 (step 52); performing the capacity change of X channels in up to the N steps in an interleaved manner that changes a subset of the X channels in each of the N steps (step 54).

The bundling process 50 generally utilizes an interleaving approach where the usable optical spectrum is divided into a finite number of logical spectrum slots denoted as M which is a positive integer (e.g., M>1), for which a maximum of N bundles needs to be applied to complete all of the requested capacity changes. For each step, the performing includes a maximum of M/N slots of the M slots with spacing between each of the M/N slots not used for the capacity change in a corresponding step. The spacing can be f, (N+f), (2N+f), . . . , M over the optical spectrum, where f is each step, f=1, 2, . . . , N. Here, the numbers represent the slots. The value M is the number of slots for dividing the optical spectrum. Values of M may include 12, 24, 48, 64, 96, etc. The value of N can be referred to as a bundling factor or ratio which determines how to break up the M slots to achieve a given capacity change within N steps.

The capacity change includes any of adding channels by replacing channel holders and removing channels by adding channel holders. In an embodiment, a capacity change can be a mix of adding and removing channels. Of course, the capacity change can also be solely adding or solely removing channels.

The bundling spectral slots or spectral boundaries can be arbitrarily selected, and the slots do not have to be of equal bandwidth, i.e., one or more slots can have higher bandwidth than others. In other words, the spectral slots' width can be dynamically adjusted based on the requested capacity change getting handled on that bundle.

For a given step, as long as a channel's signals' bandwidth falls partially or fully within a given spectral slot, it will be swapped out by the process 50 on that bundle/step. Also, it is possible to apply a 50% occupation rule to define which bundle takes care of the requested traffic signal swap for partial occupation. For capacity deletes, the deleting traffic signals are swapped out with channel holders following the same interleaving bundling. If a capacity change is not requested for a spectral slot, the channel holders on that slot remain uninterrupted during interleaving bundling mechanism.

The key point of the bundling is the interleaving spectral swap_in each bundle/step. By applying the interleaving bundling, the process 50 effectively removes the impact of gain tilt, ripple, and Spectral Hole Burning (SHB) from capacity changes and only deals with the impact of SRS on a link by controlling the bundling ratio N for a given capacity change. The bundling spectral slots can be adjacent to each other or can have a partial overlapping bandwidth If the requested capacity change ratio at any given time is below a certain percentage of the total usable spectrum such as Z, where for example, Z≤8%, the bundling factor N can be set to 1, i.e., all requested spectral slots can be swapped out in one bundle. The bundling process 50 for capacity adds is applied by each OADM node, when power is known to be available from upstream on its locally monitored points, without any communication or notification from upstream OMS controllers to sequence channel actions.

Bundling Examples

Figure 4A:
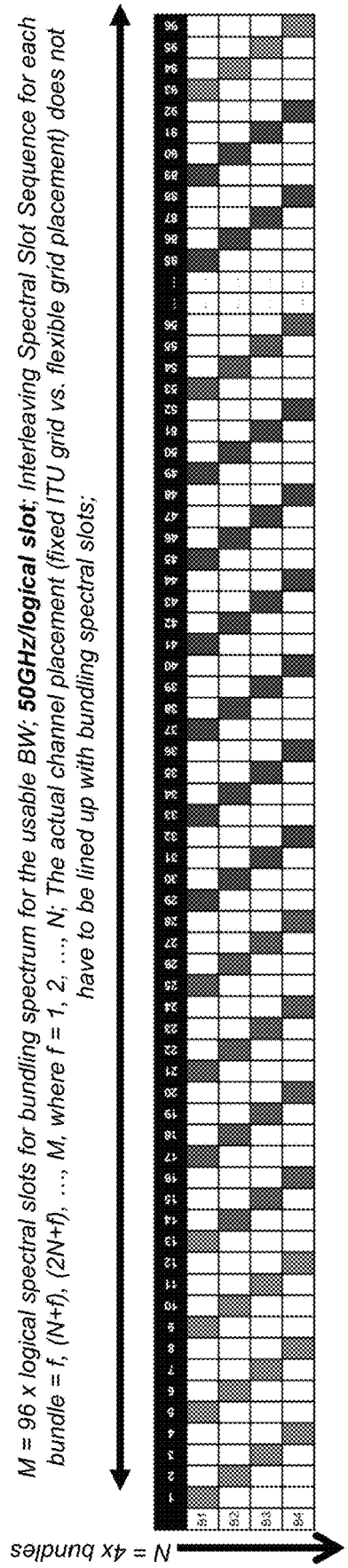
FIG. 4A is a graph of optical spectrum illustrating a bundling example using the bundling process of FIG. 3 where M=96 and N=4.
Figure 4B:
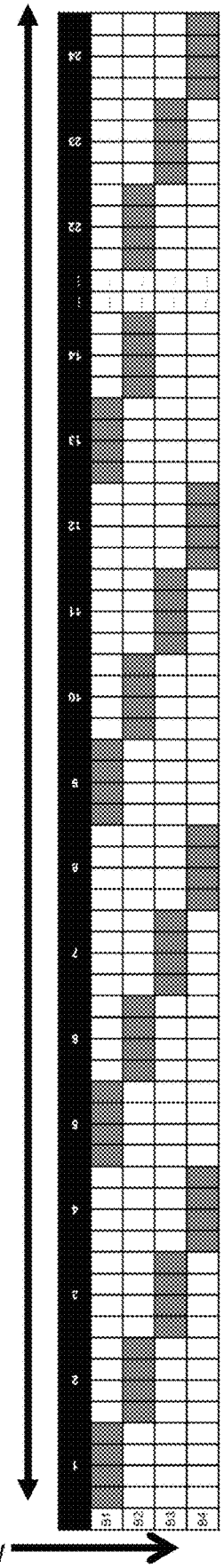
FIG. 4B is a graph of optical spectrum illustrating another bundling example using the bundling process of FIG. 3 where M=24 and N=4.

FIG. 4A is a graph of optical spectrum illustrating a bundling example where M=96 and N=4. FIG. 4B is a graph of optical spectrum illustrating another bundling example where M=24 and N=4. In FIG. 4A, M=96 logical spectral slots for bundling spectrum for the usable bandwidth with 50 GHz/logical slot. In FIG. 4B, M=24 logical spectral slots for bundling spectrum for the usable bandwidth with 200 GHz/logical slot. In both FIGS. 4A and 4B, the interleaving spectral slot sequence for each bundle=f, (N+f), (2N+f), ..., M, where f=1, 2, ..., N. The actual channel placement (fixed ITU grid versus. flexible grid placement) does not have to be lined up with bundling spectral slots.

The usable spectrum is divided into a fixed M number of spectral slots (or logical spectral boundaries with arbitrary start/stop), for which a maximum of N number of bundles applied to complete the capacity changes, where for each bundle, interleaving spectral slots spaced in N slots are swapped out to replace ASE with traffic signals, or vice versa. As long as traffic channels are falling partially or fully within a given spectral slot, it can be swapped out on that bundle. In other words, the spectral slots' width can be dynamically adjusted based on the requested capacity change getting handled on that bundle.

FIG. 5A is a graph of optical spectrum illustrating a further bundling example where M=24 and N=4. FIG. 5B is a graph of optical spectrum illustrating a bundling example where M=24 and N=4 with partial overlap. In FIG. 5A, M=12 logical spectral slots for bundling spectrum for the usable bandwidth with 400 GHz/spectral slot. In FIG. 5B, M=12 logical spectral slots for bundling spectrum for the usable bandwidth with 400-450 GHz per spectral slot with partial overlap. Again, the interleaving spectral slot sequence for each bundle=f, (N+f), (2N+f), ..., M, where f=1, 2, ..., N. The actual channel placement (fixed ITU grid vs. flexible grid placement) does not have to be lined up with bundling spectral slots. The bandwidth for spectral slots can be overlapping between consecutive bundles to ensure channel falling within the overlapping bandwidth can be swapped out by either bundle.

Figure 6:
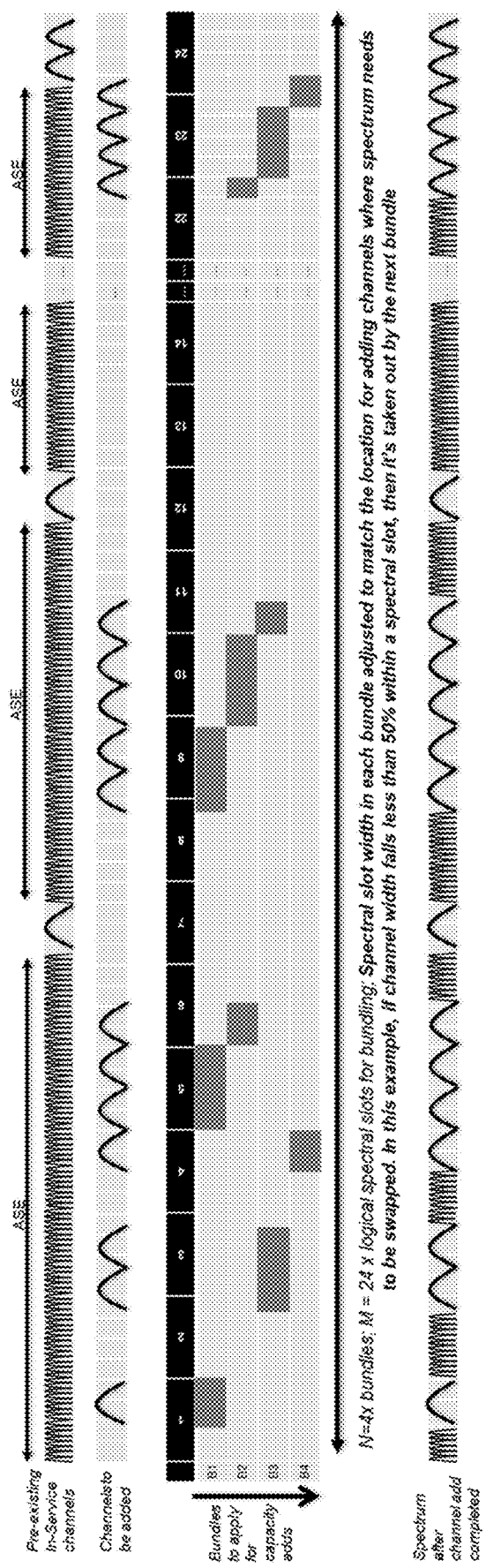
FIG. 6 is a graph of optical spectrum illustrating a further example wherein M=24 and N=4 with dynamic spectral slot width allocation.

FIG. 6 is a graph of optical spectrum illustrating a further example wherein M=24 and N=4 with dynamic spectral slot width allocation. The spectral slot width in each bundle can be adjusted to match the location for changing channels where the spectrum needs to be swapped. In this example, if channel width falls less than 50% within a spectral slot, then it's taken out by the next bundle/step. The bundling process 50 is described herein from a sectional controller point of view. However, the bundling process 50 is equally applicable for a centralized controller if it is trying to make requested bulk capacity changes in several bundles (steps) using the same methodology by introducing/removing them in interleaved spectral locations in each bundle.

Benefits

Again, the bundling process 50, due to interleaving, keeps the amplifier tilt, and gain ripples in place and removes the unusual impact of spectral hole burning and sensitivity of spectral locations for add/delete channels. The approach limits the overall SNR impact with a bundling applicable over maximum path distance for a network so that each OADM node can handle bundling asynchronously without any communication between each other, while the worst-case bundling impact remains limited by the bundling applied by the ingress OADM node. By limiting the offset impacts from tilt, ripple, and SHB, the approach reduces the bundle requirement for large capacity changes significantly that, in turn, makes a significant improvement in capacity add times.

To provide a comparison, a conventional approach can require at least 12 bundles/steps to add 95×50 GHz channels on top of 1×50 GHz channel to keep Signal to Noise Ratio (SNR) penalty low, where a 400 GHz contiguous spectral slot can be swapped out per bundle. Assuming each bundle swap will take ~1s, for a sequenced approach from OMS to OMS, the typical add time over a 10×OADM hop count path will be ~2 mins. If this conventional approach is not sequenced (performed asynchronously between sections), the contiguous spectral width per bundle will need to be reduced. That means more number of bundles will be required to complete the requested capacity change. In such case, the capacity add will be dominated by the bundling completion of the ingress mux following channel power showing up from the Tx. The capacity change time will be hop independent, and to ensure minimum SNR penalty, a maximum of 95× bundles to add 95× channels on top of 1× channel, considering 50 GHz contiguous spectral slot per bundle. A typical add time over a 10 hop count path will be ~95 sec (again, assuming ~1 sec per bundle to switch). With the bundling process 50 (asynchronous between OMS sections), and with N=4 to add 95× channels on top of 1 channel with minimal SNR penalty, the capacity add is dominated by the bundling completion of the ingress mux following channel power showing up from Tx. With the bundling process 50, capacity change time will be hop independent, and considering ~1s per bundle switching time, the typical add time over a 10× hop path will be ~4s. Although the bundling process 50 is described in the presence of channel holders for making capacity changes, it should be appreciated that the proposed interleaving bundling process can be applied for making capacity changes for non-channel holder based links as well, with the assumption that further link optimization will be performed in between two consecutive bundles to minimize the power offsets and SNR penalties on pre-existing channels.

Experimental Results

Figure 7:
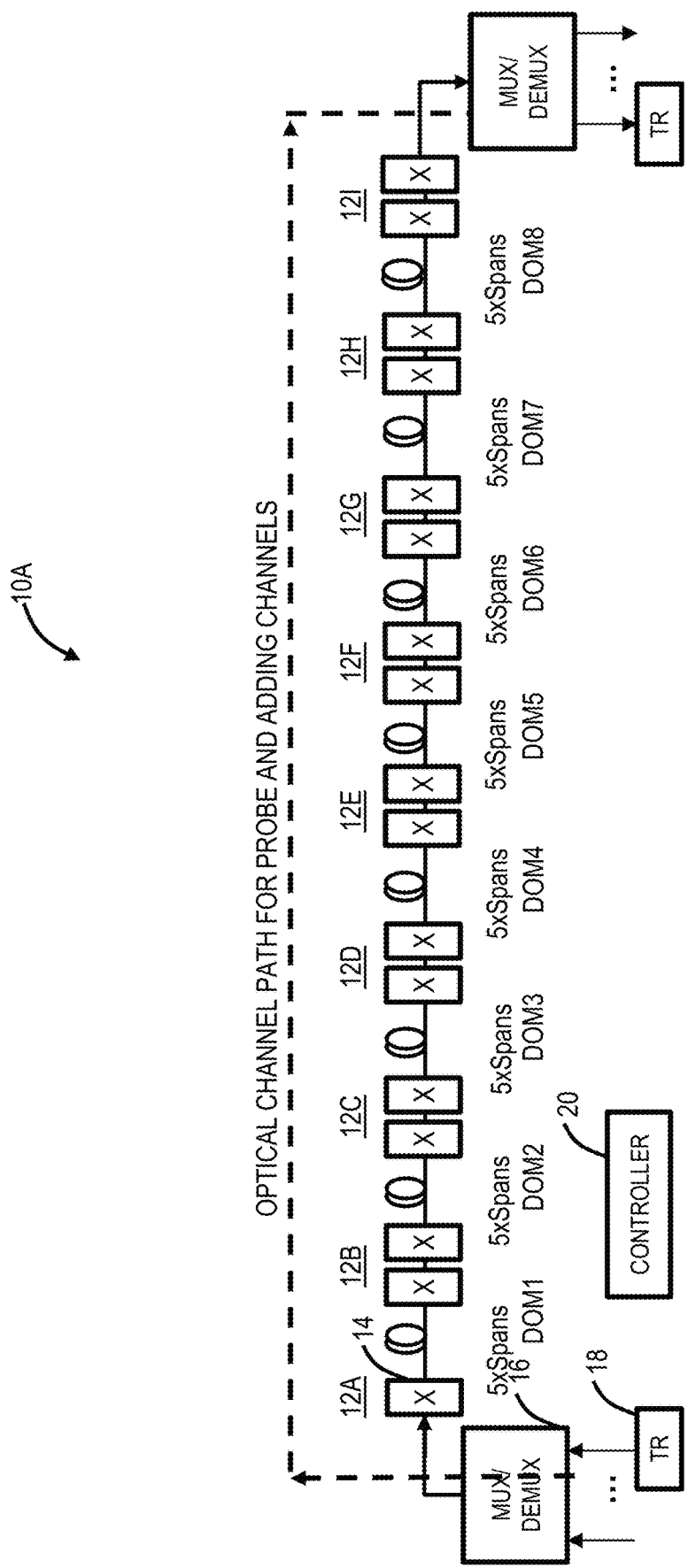
FIG. 7 is a network diagram of an example optical network including various OADM nodes.

FIG. 7 is a network diagram of an example optical network 10A including various OADM nodes 12. This example includes 9 OADM nodes 12, labeled OADM nodes 12A-12I in a linear configuration. Those skilled in the art recognize other network architectures are possible and contemplated by the systems and methods, such as mesh, ring, hub and spoke, and the like. The OADM nodes 12 include Wavelength Selective Switches (WSS) 14 or some other spectrum selective component used to form a degree facing the network 10, multiplexer/demultiplexer components 16, and optical modems 18. There are various other components known to those of ordinary skill in the art which are omitted for illustration purposes. For example, other components can include optical amplifiers including Erbium-Doped Fiber Amplifiers (EDFAs), Raman amplifiers, etc., Optical Channel Monitors (OCMs), optical controllers, Variable Optical Attenuators (VOAs), etc.

In the example of FIG. 7, the optical network 10A includes 40 spans with 5 spans between each OADM node 12. This means there are intermediate optical line amplifiers (not shown) in the network 10A, e.g., for 5 spans, there are 4 intermediate optical line amplifier nodes between each OADM node 12, incorporating a total of 6 intermediate optical line amplifiers. There can be various different configurations of the spans and the optical amplifiers. For example, in a first configuration, the spacing between nodes (i.e., between the OADM nodes 12 and the intermediate optical line amplifiers, and between the intermediate optical line amplifiers themselves) can be 80 km per span, and they can be only EDFA amplifiers per span. In a second configuration, the spacing can be 80-120 km per span with EDFA amplifiers and Raman amplifiers per span. It is possible to have spans with mixed configurations as well, where some spans are only EDFA amplified, where some spans contain both EDFA and Raman amplifiers.

The network 10A is used to test and show the validity of the bundling process 50. For test cases, a single 50 GHz probe channel is swept from low frequency to high-frequency spectral locations for maximal capacity changes. In an initial state (state 1), the network 10A has a full-filled spectrum with a single probe channel and channelized carved ASE holders going through all the 40× spans. In a transient state (state 2), all the ASE channels are removed along all the domains, only single probe channel going remains. This is to emulate the case where the head-end OADM node will the switch from ASE to traffic signal using different bundling approach, where all the other downstream OADM nodes are already done with their swap.

Two bundling approaches are considered—contiguous bundling (analogous to prior art) and the proposed interleaving bundling with the bundling process 50. A performance matrix is determined to estimate the end of section SNR delta (in 0.1 nm resolution bandwidth) between state 1 and state 2 that combines both linear and nonlinear penalties due to transient swaps. SNR penalties are observed against the spectrum, based on what a single probe channel will experience by removing ASE holders in a bundle.

FIG. 8 are graphs for the contiguous bundling with a single probe channel case. To start with, the spectrum is always full-fill with a single probe (test) channel and channelized ASE holders. Capacity change is intended for the remainder of the available spectrum occupied by ASE holders with a bundle size of 3, where $\frac{1}{3}^{rd}$ of the ASE holders from the available spectrum is removed in each bundle to replace with traffic signals. For the test case, the single probe channel location is scanned from low to high-frequency spectrum, while the capacity change takes place for the remainder of the spectrum.

Figure 9:
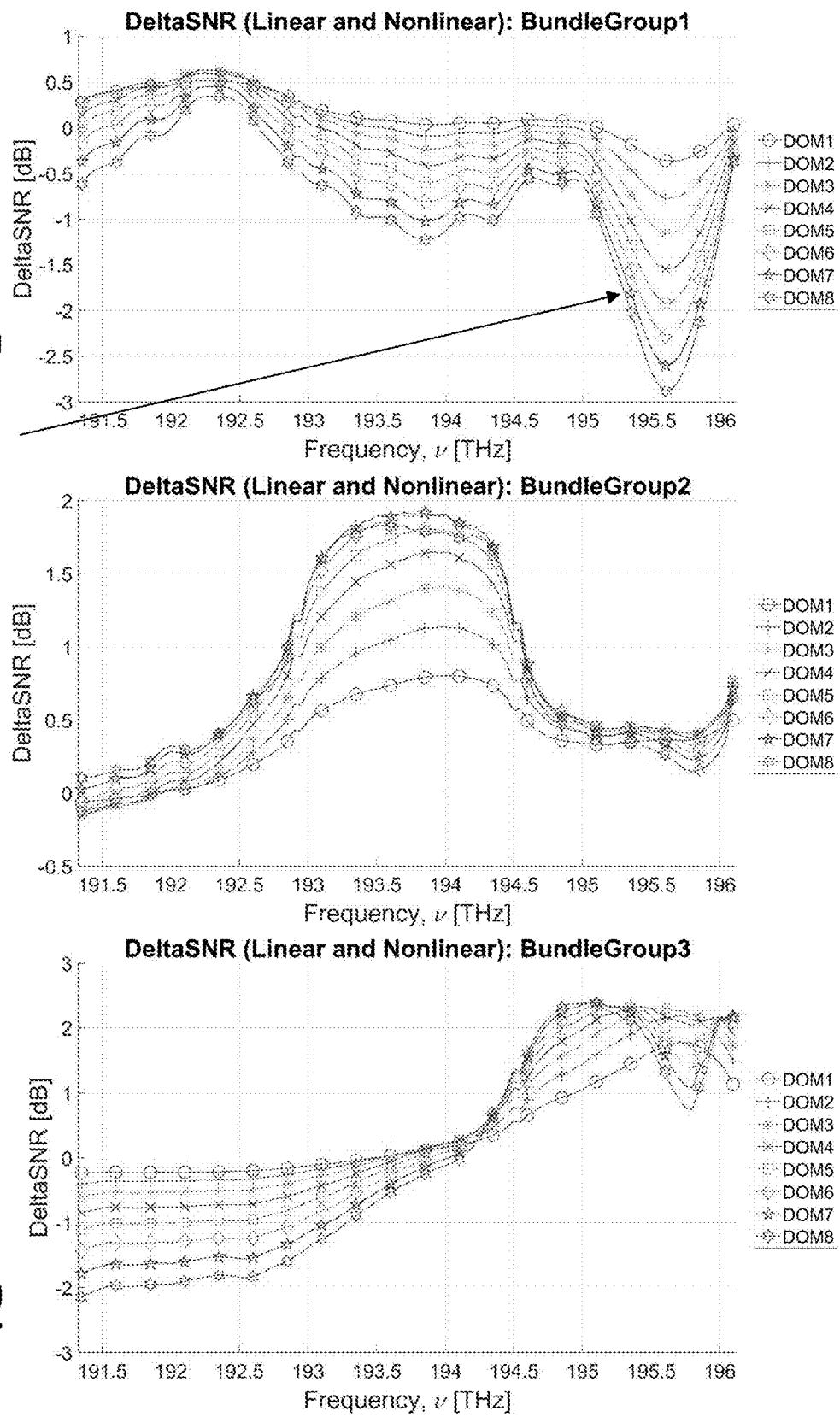
FIG. 9 are graphs for the contiguous bundling scanning the single probe channel during the capacity change.

FIG. 9 are graphs for the contiguous bundling scanning the single probe channel during the capacity change. As noted here, the gain saturation effect is enhanced when ASE channels in Bundle Group 1 is removed due to hole burning, causing almost a 3 dB SNR penalty in the worst case after 40× spans of EDFA amplified link.

Figure 10A:
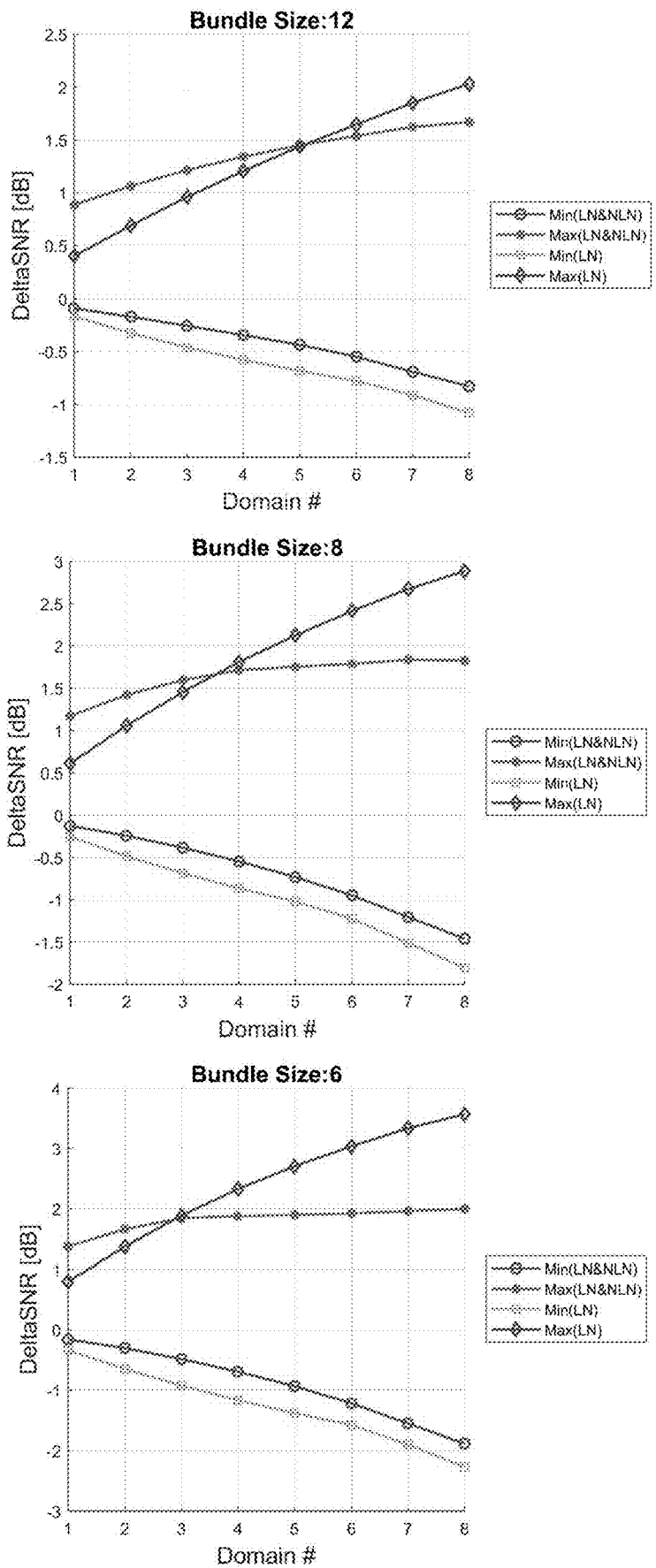
FIGS. 10A and 10B are graphs of worst-case Signal-to-Noise Ratio (SNR) penalty for a single probe channel at any given spectral location during the contiguous bundling with different bundle sizes.
Figure 10B:
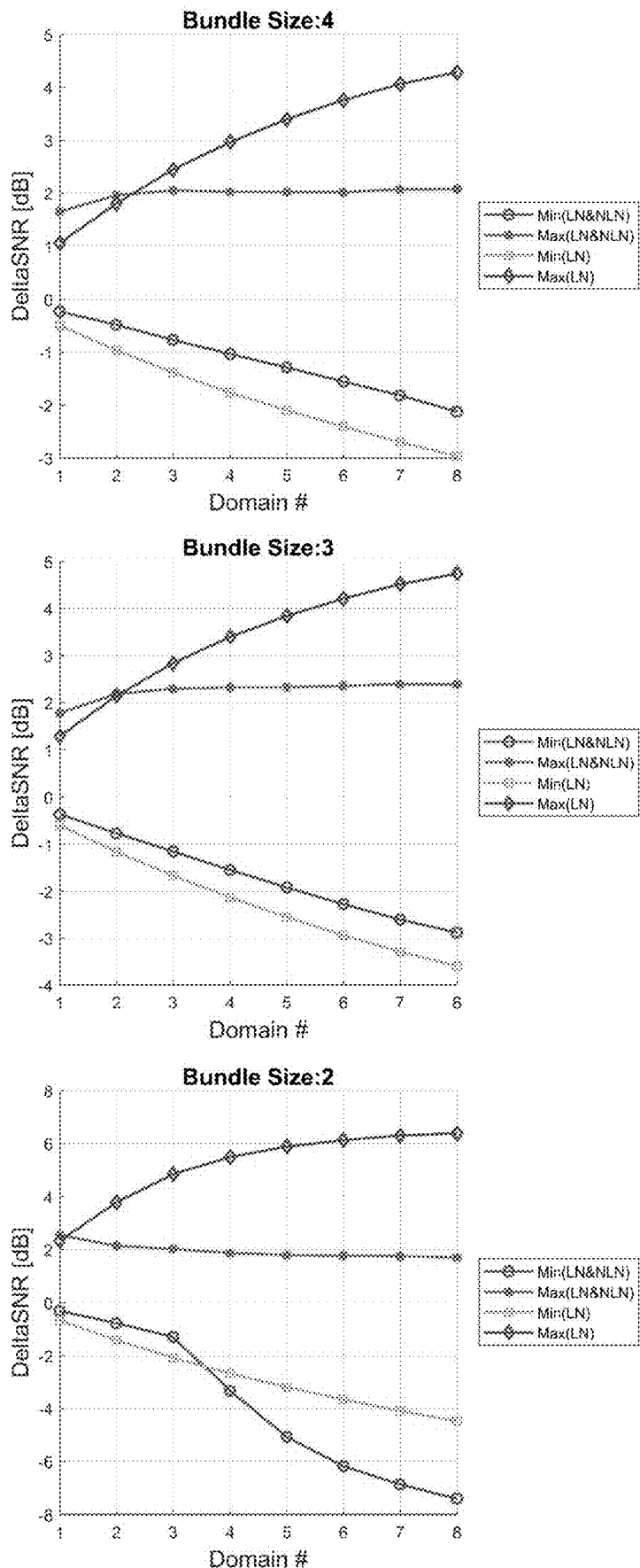

FIGS. 10A and 10B are graphs of worst case SNR penalty for a single probe channel at any given spectral location during the contiguous bundling with different bundle sizes. This shows, in order to limit the worst-case SNR penalty over 40× spans to ~1 dB, it requires at least 12 bundles or higher, i.e., 400 GHz contiguous spectral window or lower can be swapped out at a time in each bundle to swap out all the ASE holders with traffic signals in C-band (considering total usable bandwidth ~4800 GHz).

Figure 11:
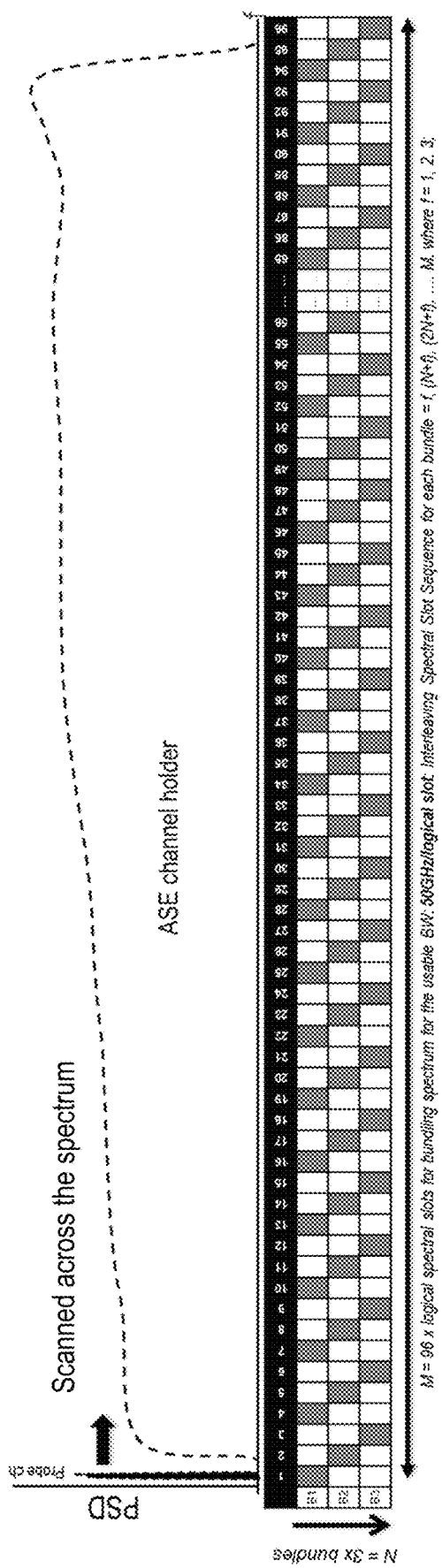
FIG. 11 is a graph of the interleaving bundle approach for comparison with the contiguous bundling approach in FIGS. 8-10.

FIG. 11 is a graph of the interleaving bundle approach for comparison with the contiguous bundling approach in FIGS. 8-10. To start with, the spectrum is always full-fill with a single probe (test) channel and channelized ASE holders. The capacity change is intended for the remainder of the available spectrum occupied by ASE holders. For the test case, as illustrated in FIG. 11, the single probe channel location is scanned from low to high-frequency spectrum, while the capacity change takes place for the remainder of the spectrum using 3× interleaving bundles. SNR penalties are observed against the spectrum, based on what a single probe channel will experience by removing ASE holders in a bundle.

Figure 12:
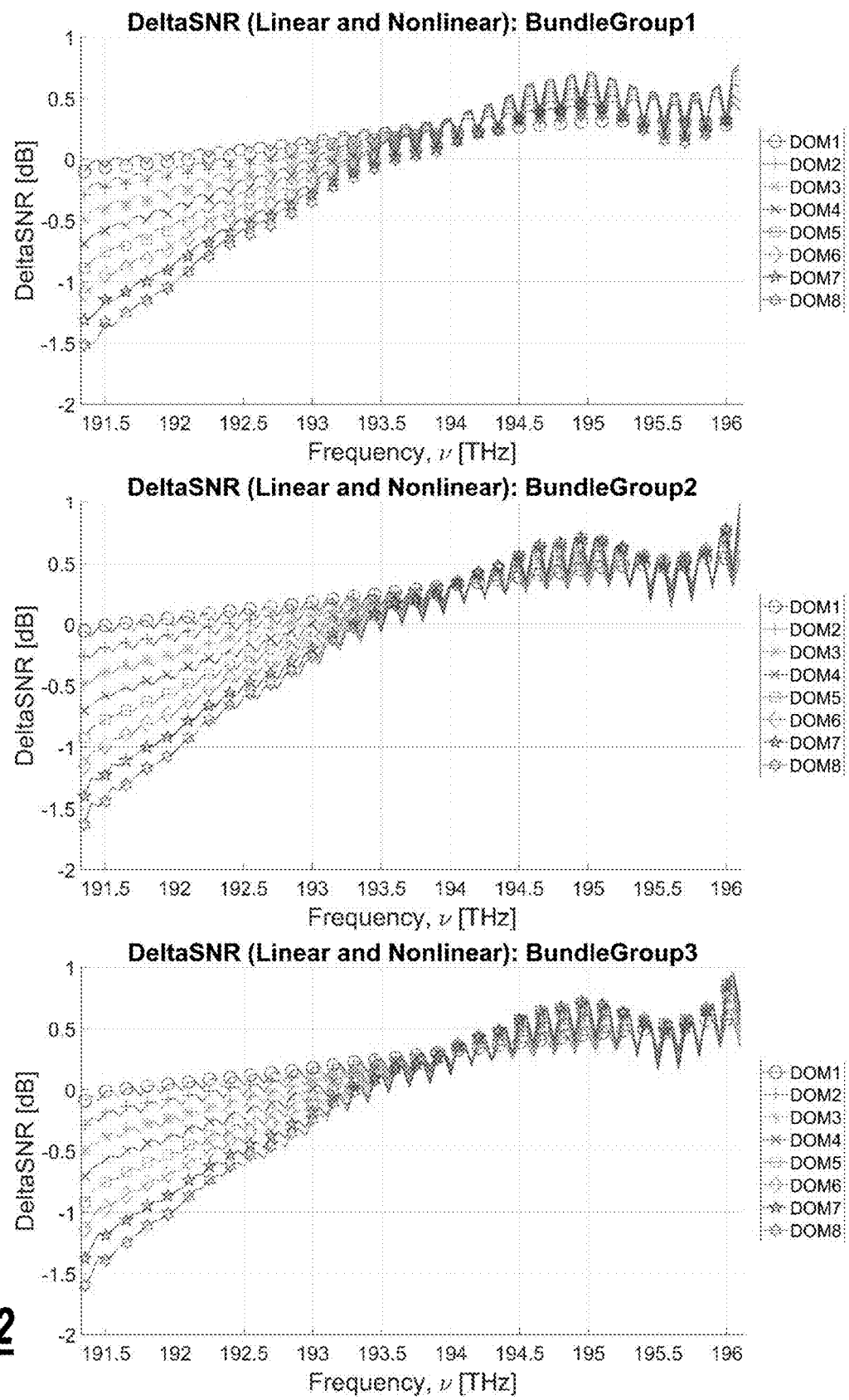
FIG. 12 is graphs for the interleaving bundling scanning the single probe channel during the capacity change.
Figure 13A:
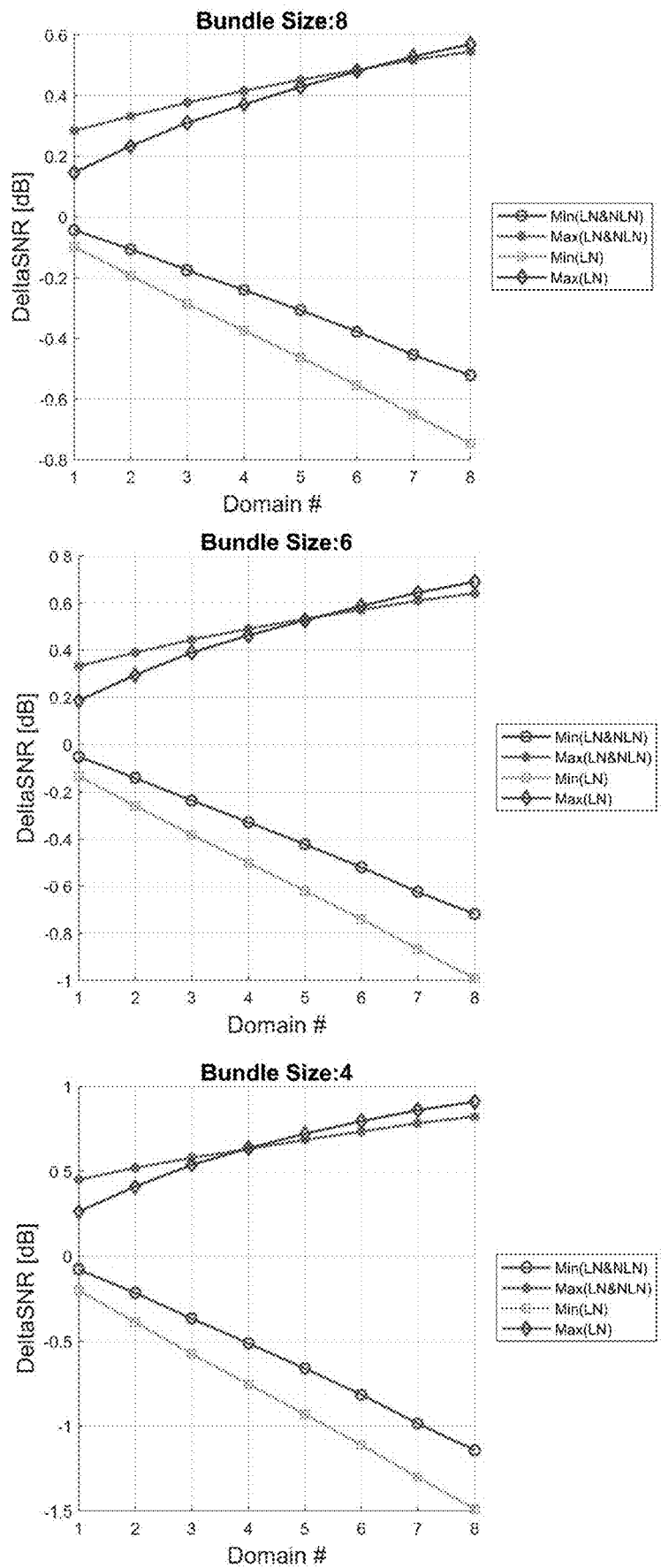

FIG. 12 is graphs for the interleaving bundling scanning the single probe channel during the capacity change with a bundle size=3. As shown, with the interleaving bundling process, the worst-case SNR penalty is observed at the lowest frequency for about 1.5 dB, almost half of what being observed with contiguous bundling of same bundle size. Also, the overall SNR penalty impact from one bundle to next remain unchanged that also allows the scope of better frequency planning for routing and assignment without worrying about the per bundle impact (such as channels with low margin can be placed near high frequency end, while channels with higher margin can be paced near the low frequency end). FIGS. 13A and 13B are graphs of the worst-case SNR penalty for a single probe channel at any given spectral location during the interleaving bundling with different bundle sizes. Here, in order to limit the worst-case SNR penalty over 40 spans to ~1 dB, with the proposed interleaving bundling approach, it requires a maximum of 4 interleaving bundles to swap out the rest of available bandwidth in C-band (considering total usable bandwidth ~4800 GHz).

Adaptive Bundling to Tolerate Unexpected Spectrum Notches

Again, with ASE loading (channel holders), the optical spectrum is expected to remain in full fill channel loading condition, all of the time regardless of the equipped traffic channels. That is, when traffic channels are not present, the missing spectrum is replaced with channelized ASE source or idlers to keep the overall spectral loading condition unchanged. Again, as described herein, managing optical spectrum with the full fill channel loading condition is operationally simpler than dealing with different channel loading conditions.

For regular capacity changes (traffic channels add/delete) or for recovering from ASE, the bundling rules and techniques described herein cab be applied to limit the total amount of spectrum switching at any given time. That means, instead of adding all channels in one switching event (that may create a large transient spectral loading changes), channels are added in multiple bundles that ensures a maximum allowable percentage of total spectrum are switched at any given time. This process essentially limits the transient impacts on remaining in-service traffic channels and mitigates any transient link budget impact. Typically, channels input powers are checked before switching away from ASE to traffic switch ports, in configurations when it is possible to know about incoming channel powers from the modem.

In disaggregated configurations, the modem (Tx/Rx) and the optical line system may be different, from different vendors, etc. and not have communication therebetween. For complete disaggregated configurations, where per channel input power measurement is not possible, controllers periodically peek on the traffic port to check for channel power availability maintaining the bundling rule/

Bundling rules (e.g., bundle count, max allowable spectrum ratio for a given bundle) are typically set based on networks' link budget requirement (such as the available margin of current and future planned channels etc.), and usually system controllers come up with some default settings.

There are use cases, where a gap or notch can be expected in an ASE loaded spectrum that cannot be filled with traffic channels or channelized ASE idlers. A gap or notch is portion of the optical spectrum unfilled with traffic channels or channelized ASE. For example, one or more modems can run photonic loopback tests at any access point that takes incoming channel power from modems and loops back from multiplexer to demultiplexer path to validate the modems to connectivity to optical equipment. Each photonic loopback setup from a modem effectively creates a notch in the spectrum, as the multiplexer/demultiplexer spectral switching slices for the given channel are switched towards the loopback port (instead of staying at line-facing ports).

In some other use cases, there could be unexpected damaged pixels in spectrum switching elements (such as WSS) that can create additional notches or spikes within the optical spectrum.

In either case, link budget estimation taken into consideration for allowing a given bundle set for capacity changes does not hold anymore due to gaps or notches within the optical spectrum. That means, when bundling for channel add or delete, for a given bundle, more optical spectrum will be missing than what was originally anticipated or planned, and that will add additional link budget penalty on remaining traffic channels. Due to additional gaps or notches in the optical spectrum, the remaining channels may experience larger than expected tilt, power offsets, or impacts of SHB during capacity changes, that was not originally taken into account for link budget margin computation.

FIGS. 14A-14D are graphs of optical spectrum illustrating the effect of steady-state spectrum notches on capacity change bundling. FIG. 14A illustrates typical ASE filled spectrum with a traffic channel, i.e., a single traffic channel and the rest of the optical spectrum has ASE loading. FIG. 14B illustrates, for a channel add, interleaved bundling creates transient spectrum notches while switching from the ASE port to traffic. FIG. 14C illustrates a channel (part of spectrum) that is in photonic loopback in an ASE filled spectrum. FIG. 14D illustrates a capacity add taking place in other areas of the spectrum, while a loopback in progress in one location, creating un-budgeted gaps within the spectrum.

Adaptive Bundling for Capacity Changes

In an embodiment, the present disclosure includes, if the optical spectrum available for traffic is not full filled (i.e., missing spectrum exists, that is gaps or notches), then there is an automatic adjustment of the bundling size for capacity changes to limit the total amount of spectrum gaps less than or equal to originally planned allowable limit during any given switching events. This automatic adjustment is referred to as adaptive bundling. Such capacity change switching event applies to adding traffic channels by switching away from channelized ASE source, or by deleting traffic channels by switching away from traffic to the channelized ASE source, or for recovering previously replaced traffic channels from ASE (similar to new adds). Again, the bundling size defines the maximum ratio of spectrum is allowed to switch at any capacity change switching events.

For example, in an ASE loaded system, when a bundle-size is set to 4×, that basically means at any given switching events, a "maximum" of about 25% spectrum can be swapped out from ASE to traffic or vice versa. That means, in a 4.8 THz spectrum for a given band, a 1.2 THz gap is allowed (if gaps are made interleaved across the spectrum as comb, that allows better link budget performance on remaining channels). In an example case, if a photonic loopback is performed on the given degree for a channel (e.g., 200 GHz bandwidth), it effectively means, on a given bundle (i.e., during switching event), we may see more than >25% spectrum gaps at the worst case.

To address this, there is a need to determine any missing optical spectrum before the capacity change switching events, and to dynamically adjust the bundling count. In this example (one bundling maximum at 25%), any missing optical spectrum limiting the total spectrum-gap at any given time would decrease the bundling count to 25%. For example, if 200 GHz spectrum is used for loopback, then out of max 1.2 THz allocated for a given bundle, 200 GHz is already taken (missing in the spectrum), and then controller can only allow a max of 1 THz for a given bundle to switch spectrum. This determination can be implemented in the controller 20, as well as in other locations. The controller 20 can dynamically calculates the condition, and effectively moves bundling count from 4 to 5, in this example.

This approach can apply equivalently to C-only or L-only or C+L systems, where bundling spectrum ratio can be dynamically adjusted per band independent of gaps present on other bands, or considering the total impact on a combined band spectrum.

Figure 15:
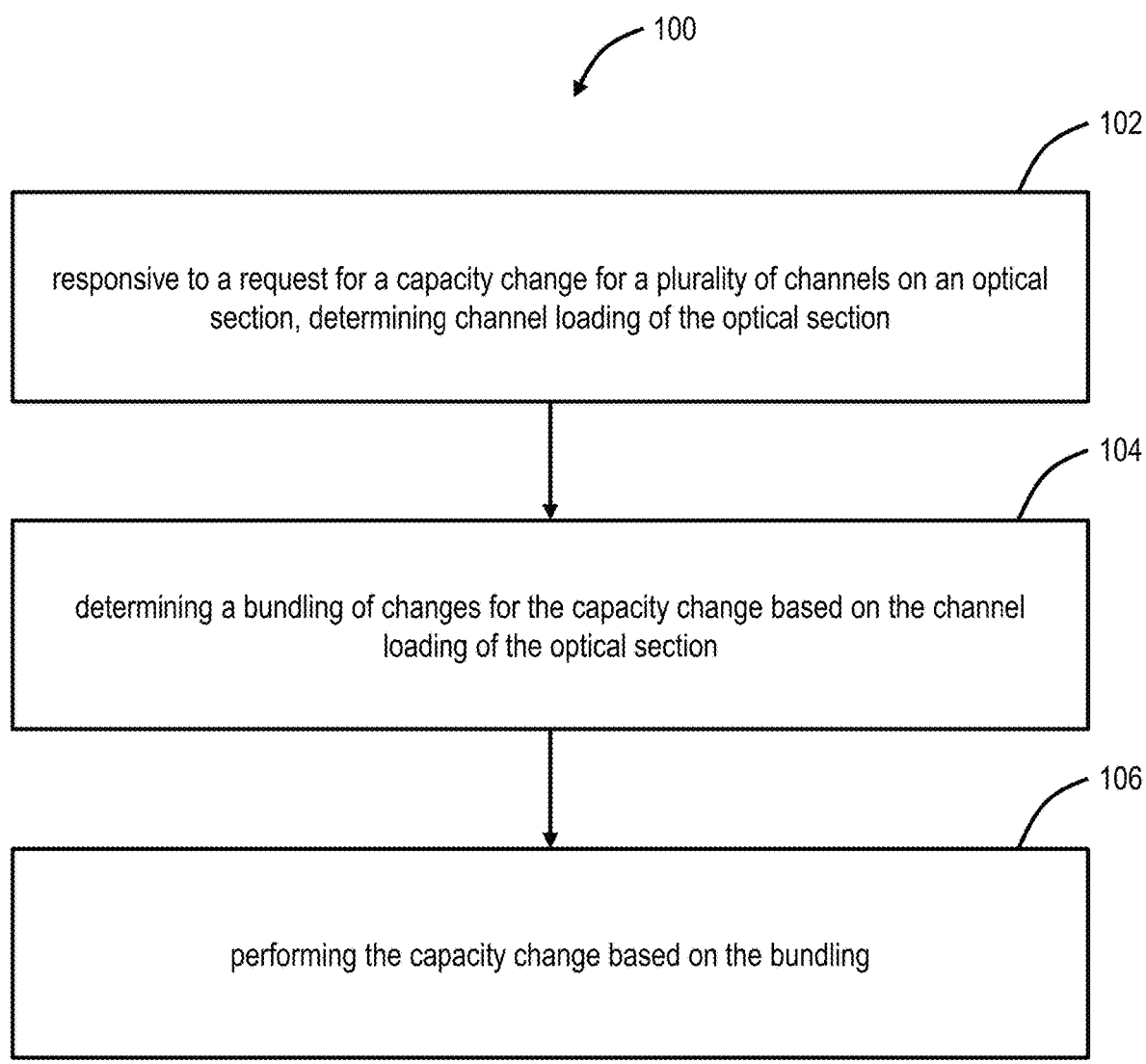
FIG. 15 is a flowchart of an adaptive bundling process for bundling capacity changes in an optical section.

FIG. 15 is a flowchart of an adaptive bundling process 100 for bundling capacity changes in an optical section. The process 100 contemplates implementation as a method having steps, via a processing device such as the controller 20 configured to implement the steps, via the OADM 10 having the controller 20 configured to implement the steps, and as a non-transitory computer-readable medium having instructions executable by a processor that, in response to such execution, cause the processor to implement the steps. Note, the process 100 contemplates operation to bundle capacity changes on an optical link 14, i.e., optical section or OMS. There can be various physical implementations, all of which are contemplated herein.

The adaptive bundling process 100 includes, responsive to a request for a capacity change for a plurality of channels on an optical section, determining channel loading of the optical section (step 102); determining a bundling of changes for the capacity change based on the channel loading of the optical section (step 104); and performing the capacity change based on the bundling (step 106). Note, the performing can also mean causing performance of.

The bundling includes a number of steps to achieve all of the capacity change and a maximum allowable amount of optical spectrum that can be changed in each step. The maximum allowable amount of optical spectrum that can be changed in each step can be adaptively determined based on the channel loading. The capacity change includes addition of a traffic channel by switching away from a channel holder source, deletion of a traffic channel by switching to the channel holder source, and a combination thereof.

The optical section includes a full fill loading condition of its optical spectrum that includes any of traffic channels, channel holders, and unoccupied spectrum. The unoccupied spectrum can include a notch or gap in the optical spectrum, wherein the unoccupied spectrum reduces a maximum allowable amount of the optical spectrum that can be changed in any step of the bundling. The unoccupied spectrum can include a notch or gap in the optical spectrum, such as, e.g., due to one or more of a loopback channel and equipment issues related to multiplexing and demultiplexing components in the optical section.

In another embodiment, an OADM includes a Wavelength Selective Switch (WSS) having inputs connected to a channel holder source and a plurality of traffic ports, and having an output connected to an optical section; and a controller configured to, responsive to a request for a capacity change for a plurality of channels on the optical section, determine channel loading of the optical section, determine a bundling of changes for the capacity change based on the channel loading of the optical section, and cause the capacity change based on the bundling, wherein the capacity change includes switching between any of the channel holder source and the plurality of traffic ports.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A controller comprising:
a processor; and
memory including instructions executable by the processor that, in response to such execution, cause the processor to
responsive to a request for a capacity change for a plurality of channels on an optical section, determine spectral loading of the optical section,
determine a bundling of changes for the capacity change based on the spectral loading of the optical section, and
cause the capacity change based on the bundling, wherein the capacity change includes addition of a traffic channel by switching away from a channel holder source, deletion of a traffic channel by switching to the channel holder source, switching from one traffic channel source to another traffic channel source, and a combination thereof.

2. The controller of claim 1, wherein the bundling includes a number of steps to achieve all of the capacity change and a maximum allowable amount of optical spectrum that can be changed in each step.

3. The controller of claim 2, wherein the maximum allowable amount of optical spectrum that can be changed in each step is adaptively determined based on the spectral loading.

4. The controller of claim 1, wherein the optical section includes a full fill loading condition of its optical spectrum that includes any of traffic channels, channel holders, and unoccupied spectrum.

5. The controller of claim 4, wherein the unoccupied spectrum includes a notch or gap in the optical spectrum, wherein the unoccupied spectrum reduces a maximum allowable amount of the optical spectrum that can be changed in any step of the bundling.

6. The controller of claim 4, wherein the unoccupied spectrum includes a notch or gap in the optical spectrum, due to a loopback channel.

7. The controller of claim 4, wherein the unoccupied spectrum includes a notch or gap in the optical spectrum, due to equipment issues related to multiplexing and demultiplexing components in the optical section.

8. A method comprising steps of:
responsive to a request for a capacity change for a plurality of channels on an optical section, determining spectral loading of the optical section;
determining a bundling of changes for the capacity change based on the spectral loading of the optical section; and
performing the capacity change based on the bundling, wherein the capacity change includes addition of a traffic channel by switching away from a channel holder source, deletion of a traffic channel by switching to the channel holder source, and a combination thereof.

9. The method of claim 8, wherein the bundling includes a number of steps to achieve all of the capacity change and a maximum allowable amount of optical spectrum that can be changed in each step.

10. The method of claim 9, wherein the maximum allowable amount of optical spectrum that can be changed in each step is adaptively determined based on the channel loading.

11. The method of claim 8, wherein the optical section includes a full fill loading condition of its optical spectrum that includes any of traffic channels, channel holders, and unoccupied spectrum.

12. The method of claim 11, wherein the unoccupied spectrum includes a notch or gap in the optical spectrum, wherein the unoccupied spectrum reduces a maximum allowable amount of the optical spectrum that can be changed in any step of the bundling.

13. The method of claim 11, wherein the unoccupied spectrum includes a notch or gap in the optical spectrum, due to one or more of a loopback channel and equipment issues related to multiplexing and demultiplexing components in the optical section.

14. A controller comprising:
a processor; and
memory including instructions executable by the processor that, in response to such execution, cause the processor to
responsive to a request for a capacity change for a plurality of channels on an optical section, determine spectral loading of the optical section, wherein the optical section includes a full fill loading condition of its optical spectrum that includes any of traffic channels, channel holders, and unoccupied spectrum,
determine a bundling of changes for the capacity change based on the spectral loading of the optical section, and
cause the capacity change based on the bundling.

15. The controller of claim 14, wherein the bundling includes a number of steps to achieve all of the capacity change and a maximum allowable amount of optical spectrum that can be changed in each step.

16. The controller of claim 15, wherein the maximum allowable amount of optical spectrum that can be changed in each step is adaptively determined based on the spectral loading.

17. The controller of claim 14, wherein the capacity change includes addition of a traffic channel by switching away from a channel holder source, deletion of a traffic channel by switching to the channel holder source, switching from one traffic channel source to another traffic channel source, and a combination thereof.

18. The controller of claim 14, wherein the unoccupied spectrum includes a notch or gap in the optical spectrum, wherein the unoccupied spectrum reduces a maximum allowable amount of the optical spectrum that can be changed in any step of the bundling.

19. The controller of claim 14, wherein the unoccupied spectrum includes a notch or gap in the optical spectrum, due to a loopback channel.

20. The controller of claim 14, wherein the unoccupied spectrum includes a notch or gap in the optical spectrum, due to equipment issues related to multiplexing and demultiplexing components in the optical section.

* * * * *